United States Patent
Miki (10) Patent No.: US 10,246,282 B2
(45) Date of Patent: Apr. 2, 2019

(54) DRIVE TRANSMISSION DEVICE AND IMAGE FORMING APPARATUS

(71) Applicant: KYOCERA Document Solutions Inc., Osaka (JP)

(72) Inventor: Masafumi Miki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 139 days.

(21) Appl. No.: 15/508,661

(22) PCT Filed: Mar. 10, 2016

(86) PCT No.: PCT/JP2016/057579
§ 371 (c)(1),
(2) Date: Mar. 3, 2017

(87) PCT Pub. No.: WO2016/163203
PCT Pub. Date: Oct. 13, 2016

(65) Prior Publication Data
US 2017/0297839 A1      Oct. 19, 2017

(30) Foreign Application Priority Data

Apr. 6, 2015 (JP) ................................. 2015-077794

(51) Int. Cl.
*B65H 3/06* (2006.01)
*B65H 5/06* (2006.01)
(Continued)

(52) U.S. Cl.
CPC ............ *B65H 3/0669* (2013.01); *B65H 1/14* (2013.01); *B65H 3/0684* (2013.01); *B65H 3/5261* (2013.01); *B65H 5/062* (2013.01); *B65H 7/00* (2013.01); *F16D 41/06* (2013.01); *F16D 48/06* (2013.01); *F16H 3/091* (2013.01); *F16H 3/093* (2013.01); *F16H 3/10* (2013.01); *G03G 15/00* (2013.01); *G03G 15/50* (2013.01); *G03G 15/6511* (2013.01); *G03G 15/6529* (2013.01);
(Continued)

(58) Field of Classification Search
CPC combination set(s) only.
See application file for complete search history.

(56) References Cited

U.S. PATENT DOCUMENTS

| 4,846,768 | A | * | 7/1989 | Kitami | .................... F02B 67/06 474/86 |
|---|---|---|---|---|---|
| 6,608,991 | B2 | * | 8/2003 | Takada | ............... G03G 15/6564 399/303 |
| 2012/0224883 | A1 | * | 9/2012 | Okano | .................. G03G 21/169 399/101 |

FOREIGN PATENT DOCUMENTS

| GB | 1379339 A | * | 1/1975 | ............... F16H 9/06 |
|---|---|---|---|---|
| JP | 56141251 A | * | 11/1981 | ............. B65H 23/18 |

(Continued)

*Primary Examiner* — Nguyen Q. Ha
(74) *Attorney, Agent, or Firm* — Studebaker & Brackett PC (57) ABSTRACT

A drive transmission device (6) includes a first drive train (62) and a second drive train (63). The first drive train (62) includes a first gear (621), a second gear (622), a rotary shaft (623), and one-way clutches (624). The second drive train (63) includes a third gear (631), a fourth gear (632), a rotary shaft (633), and an electromagnetic clutch (634). The third gear (631) engages the first gear (621) and the fourth gear (632) engages the second gear (622). A rotational speed of a pickup roller (12) is switched by switching on/off the electromagnetic clutch (634) to change a transmission path of driving force.

11 Claims, 6 Drawing Sheets

(51) Int. Cl.
  *B65H 7/00*     (2006.01)
  *G03G 15/00*    (2006.01)
  *F16D 41/06*    (2006.01)
  *F16H 3/10*     (2006.01)
  *F16D 48/06*    (2006.01)
  *F16H 3/093*    (2006.01)
  *B65H 1/14*     (2006.01)
  *B65H 3/52*     (2006.01)
  *G03G 21/16*    (2006.01)
  *F16H 3/091*    (2006.01)

(52) U.S. Cl.
  CPC ............... *G03G 21/1647* (2013.01); *B65H 2301/423245* (2013.01); *B65H 2402/10* (2013.01); *B65H 2403/72* (2013.01); *B65H 2403/724* (2013.01); *B65H 2403/82* (2013.01); *B65H 2405/313* (2013.01); *B65H 2405/332* (2013.01); *B65H 2801/06* (2013.01); *G03G 2215/00396* (2013.01)

(56) References Cited

FOREIGN PATENT DOCUMENTS

| JP | 57141308 A | * | 9/1982 | ............ B65G 27/30 |
| JP | 57175638 A | * | 10/1982 | ............ B65H 5/06 |
| JP | 05265271 A | * | 10/1993 | ............ G03G 15/00 |
| JP | 10114441 A | * | 5/1998 | ............ B65H 5/02 |
| JP | 2009-132505 A | | 6/2009 | |

* cited by examiner

DRIVE TRANSMISSION DEVICE AND IMAGE FORMING APPARATUS

TECHNICAL FIELD

The present invention relates to a drive transmission device and an image forming apparatus.

BACKGROUND ART

It has been known to change a conveyance speed of a conveyance roller that conveys for example paper in an image forming apparatus.

For example, a disclosed paper conveyance device switches the conveyance speed between two levels by performing intermittent operations of two intermediate roller clutches so as to be reversed from each other (see Patent Literature 1). Specifically, a first intermediate roller clutch intermits transmission of power from a motor to a first intermediate roller. A second intermediate roller clutch intermits transmission of the power from the motor to a second intermediate roller. By performing the intermittent operations of the two intermediate roller clutches so as to be reversed from each other, it is possible to switch constant speed driving not through an acceleration mechanism and acceleration driving through the acceleration mechanism.

The paper conveyance device disclosed in Patent Literature 1 is described to be capable of improving freedom of arrangement since there is no need to secure a large space for arrangement in the vicinity of an end of a rotary shaft of a roller.

CITATION LIST

Patent Literature

[Patent Literature 1]
Japanese Patent Application Laid-Open Publication No. 2009-132505

SUMMARY OF INVENTION

Technical Problem

However, in the paper conveyance device disclosed in Patent Literature 1, the two clutches need to be arranged and power transmission mechanisms for the respective clutches need to be provided. Therefore, there was still room for cost reduction.

The present invention was made in view of the above problem, and it is an object of the present invention to provide a drive transmission device and an image forming apparatus that are capable of switching a rotational speed of an output shaft between two levels with a simple configuration.

Solution to Problem

A drive transmission device of the present invention transmits rotation of a motor to a roller via a plurality of drive trains and includes a controller, a first drive train, and a second drive train. The first drive train includes a one-way clutch. The second drive train is different from the first drive train and includes an electromagnetic clutch. The first drive train receives driving force from the motor and transmits the driving force to the second drive train. The second drive train transmits the driving force from the first drive train to the roller. The controller switches a rotational speed of the roller by switching on/off the electromagnetic clutch.

An image forming apparatus of the present invention includes an image forming section and the drive transmission device. The image forming section forms an image on recording paper.

Advantageous Effects of Invention

According to the drive transmission device and the image forming apparatus of the present invention, a rotational speed of an output shaft can be switched between two levels with a simple configuration.

BRIEF DESCRIPTION OF DRAWINGS

FIG. 5 is a side view illustrating an operation of the drive transmission device illustrated in FIG. 3 in a situation in which an electromagnetic clutch is turned on.

DESCRIPTION OF EMBODIMENTS

The following describes an embodiment of the present invention with reference to the drawings (FIGS. 1-6). In the drawings, elements that are the same or substantially equivalent are labelled using the same reference signs and explanation thereof is not repeated.

Figure 1:
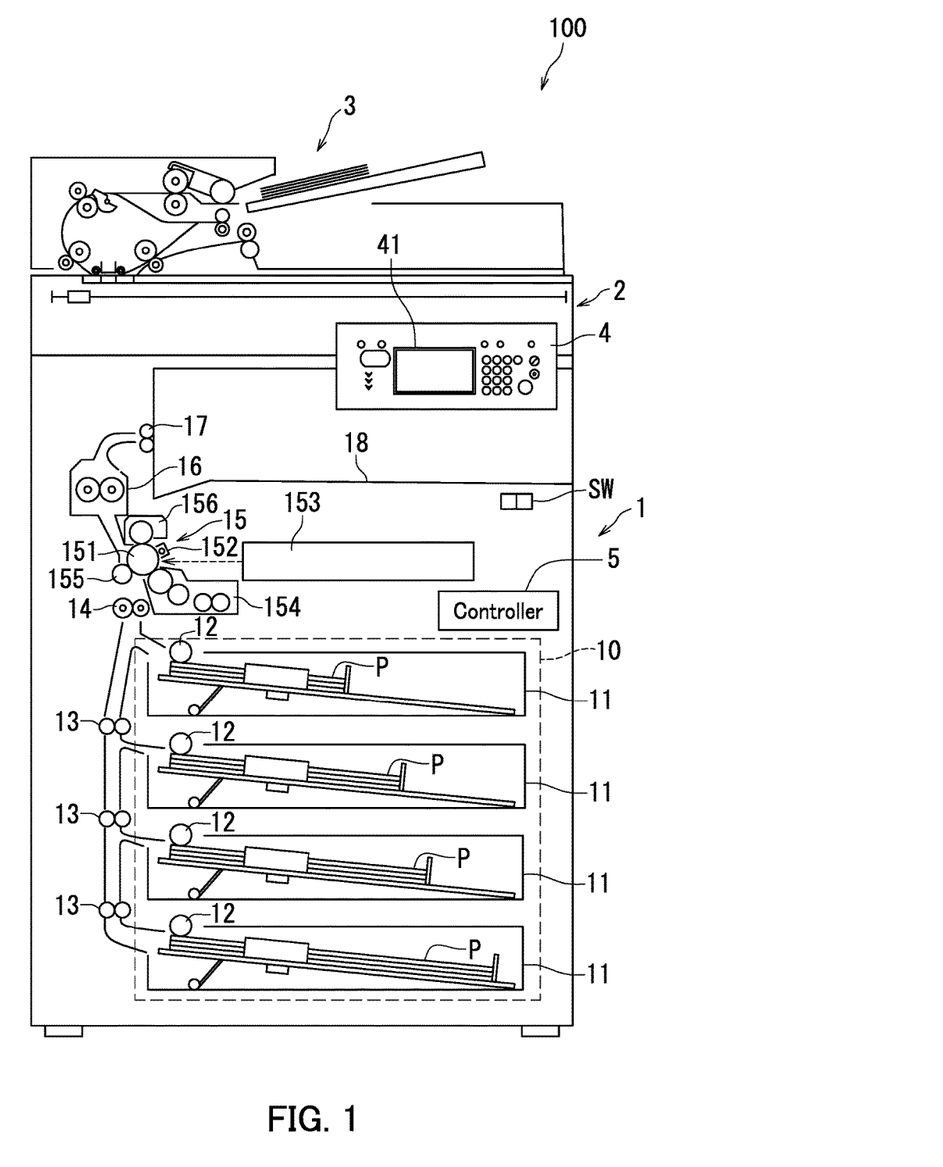
FIG. 1 is a diagram illustrating a configuration of an image forming apparatus according to an embodiment of the present invention.

First, an image forming apparatus 100 according to the present embodiment will be described with reference to FIG. 1. FIG. 1 is a diagram illustrating a configuration of the image forming apparatus 100 according to the present embodiment. The image forming apparatus 100 in the present embodiment is a multifunction peripheral. The image forming apparatus 100 has functions of a scanner, a copier, a printer and a facsimile machine. The image forming apparatus 100 includes an image forming unit 1, an image reading unit 2, a document conveyance unit 3, an operation panel 4, a controller 5, and a power switch SW.

The image forming unit 1 forms an image on recording paper P. The image reading unit 2 reads an image formed on a document. The document conveyance unit 3 conveys the document to be read. The operation panel 4 includes a touch panel 41 and receives an operation to the image forming apparatus 100 by a user. The controller 5 controls overall operation of the image forming apparatus 100. The power switch SW turns on or off a power source of the image forming apparatus 100.

The image forming unit 1 includes a paper feed unit 10, conveyance roller pairs 13, a registration roller pair 14, an image forming section 15, a fixing device 16, an ejection roller pair 17, and an exit tray 18. The paper feed unit 10 includes four paper feed cassettes 11 and four pickup rollers 12. The pickup rollers 12 each pick up the recording paper P from one of the paper feed cassettes 11 and feed one sheet of the recording paper P at a time. The recording paper P fed by the pickup roller 12 is conveyed by the conveyance roller pair 13 and the registration roller pair 14 to the image forming section 15.

The image forming section 15 forms an image on the recording paper P conveyed from the paper feed cassette 11. The image forming section 15 includes a photosensitive drum 151, a charger 152, a light exposure section 153, a development section 154, a transfer roller 155, and a cleaning section 156. The photosensitive drum 151 is a cylindrical rotating body having a circumferential surface on which an electrostatic latent image is formed. The charger 152 charges the photosensitive drum 151 to a predetermined potential. The light exposure section 153 irradiates the photosensitive drum 151 with laser light based on image data to form an electrostatic latent image according to the image data on the photosensitive drum 151. Note that image data generated by reading a document by the image reading unit 2 and image data received from an external computer via a communication network not shown are for example used as the image data.

The development section 154 develops the electrostatic latent image formed on the photosensitive drum 151 by supplying a toner to form a toner image on the photosensitive drum 151. The transfer roller 155 transfers the toner image on the photosensitive drum 151 to the recording paper P. The cleaning section 156 removes a residual toner remaining on the photosensitive drum 151 after the transfer. The recording paper P on which an image has been formed by the image forming section 15 is conveyed to the fixing device 16.

The image formed on the recording paper P is thermally fixed to the recording paper P by the fixing device 16. The fixing device 16 includes a heating roller with an internal heating element and a pressure roller. The heating roller and the pressure roller are pressed against each other to form a fixing nip part therebetween. The toner adhering to the surface of the recording paper P is heated and melted while the recording paper P passes through the fixing nip part, whereby the toner image is fixed to the recording paper P. The recording paper P to which the toner image has been fixed is ejected to the exit tray 18 by the ejection roller pair 17.

The controller 5 includes a central processing unit (CPU), a read only memory (ROM), and a random access memory (RAM). The ROM stores a control program therein. The CPU controls the overall operation of the image forming apparatus 100 through reading and execution of the control program stored in the ROM. The RAM is used as a work area when the CPU executes the control program.

Figure 2:
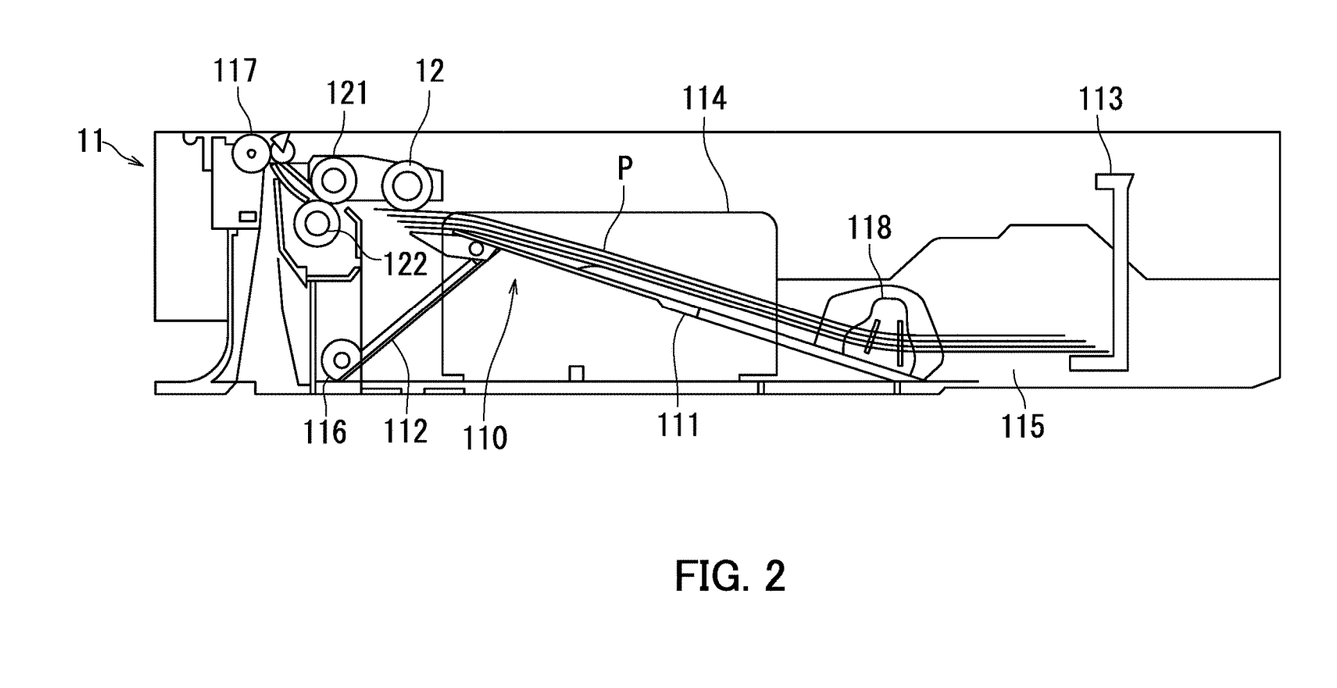
FIG. 2 is a side view illustrating a configuration of a paper feed cassette illustrated in FIG. 1.

Next, a configuration of the paper feed cassette 11 will be described with reference to FIG. 2. FIG. 2 is a side view illustrating the configuration of the paper feed cassette 11. Note that FIG. 2 illustrates a state in which the paper feed cassette 11 is mounted in the paper feed unit 10. The paper feed cassette 11 includes a lift mechanism 110, a rear edge guide 113, a side edge guide pair 114, a sheet accommodation section 115, a conveyance roller 117, and a retard roller 122. The lift mechanism 110 is a mechanism for pressing the recording paper P placed thereon against a paper feed roller 121. The lift mechanism 110 includes a lift plate 111, an uplift member 112, a drive shaft 116, and a support portion 118.

As illustrated in FIG. 2, the paper feed cassette 11 includes the lift plate 111 located on the inner bottom surface of the sheet accommodation section 115. A plurality of sheets of the recording paper P are placed on the lift plate 111. The upstream end of the lift plate 111 in a paper feed direction (the right end in FIG. 2) is supported by the support portion 118 such that the lift plate 111 is turnable. In other words, the lift plate 111 is supported by the support portion 118 within the sheet accommodation section 115 so as to be turnable in a vertical plane. The downstream end of the lift plate 111 in the paper feed direction is a free end. The support portion 118 is provided at each of side walls of the sheet accommodation section 115 opposed to each other in the width direction of the recording paper P (a direction orthogonal to the paper feed direction).

The side edge guide pair 114 determines a position of the recording paper P accommodated in the sheet accommodation section 115 in the width direction of the recording paper P. The rear edge guide 113 aligns the rear edge of the recording paper P. The side edge guide pair 114 is provided so as to be movable in the width direction of the recording paper P (the direction perpendicular to the plane of FIG. 2) along a guide rail not shown. Here, the rear edge guide 113 is provided so as to be movable in parallel to a sheet conveyance direction (a lateral direction in FIG. 2). By moving the side edge guide pair 114 and the rear edge guide 113 in accordance with the size of the recording paper P, the recording paper P is located in a predetermined position within the paper feed cassette 11.

The drive shaft 116 and the uplift member 112 are located below a downstream portion of the lift plate 111 in the paper feed direction. The drive shaft 116 and the uplift member 112 move the lift plate 111 between a paper feed position and a retraction position. In a situation in which the paper feed cassette 11 is mounted, power of a lift driving motor not shown can be transmitted to the drive shaft 116. The above-described paper feed position refers to a position of the lift plate 111 (a position illustrated in FIG. 2) that has been raised such that the uppermost sheet of the recording paper P placed on the lift plate 111 comes in contact with the pickup roller 12 and is able to be fed. The above-described retraction position refers to a position of the lift plate 111 that has been lowered to a descent limit.

The paper feed cassette 11 also includes the retard roller 122 located below the paper feed roller 121. Further, the conveyance roller 117 is located downstream (on the left in FIG. 2) of the pickup roller 12 and the paper feed roller 121 in the paper feed direction. The paper feed roller 121 and the pickup roller 12 are located within a casing of the paper feed unit 10 rather than the paper feed cassette 11. The retard roller 122 and the conveyance roller 117 are located within the paper feed cassette 11. In a situation in which the paper feed cassette 11 is mounted in the image forming unit 1, the paper feed roller 121 and the retard roller 122 are in contact with each other as illustrated in FIG. 2.

The paper feed roller 121 feeds the recording paper P picked-up by the pickup roller 12 to the conveyance roller 117. The paper feed roller 121 rotates in a direction to convey the recording paper P downstream in the paper feed direction (leftward in FIG. 2). By contrast, the retard roller 122 rotates in a direction to send back the recording paper P upstream in the paper feed direction (rightward in FIG. 2). Even in a situation in which the pickup roller 12 picks up a plurality of sheets of the recording paper P at a time, the retard roller 122 prevents sheets of the recording paper P other than the uppermost sheet from being fed to the conveyance roller 117. Therefore, only the uppermost sheet of the recording paper P is conveyed by the paper feed roller 121 to the conveyance roller 117. Then, the conveyance roller 117 conveys the recording paper P to the conveyance roller pair 13 (see FIG. 1).

Figure 3:
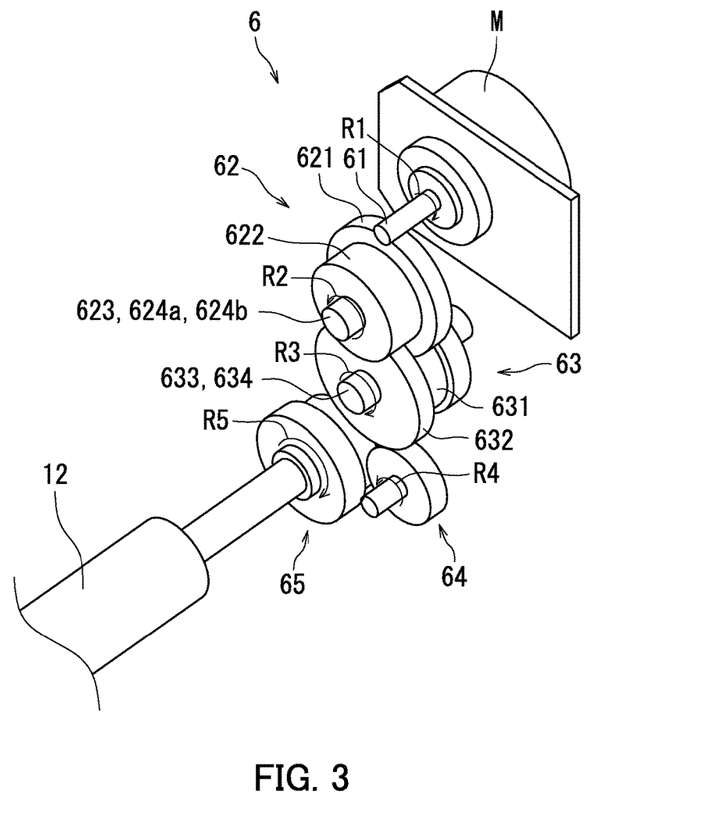
FIG. 3 is a perspective view illustrating a drive transmission device that drives a pickup roller illustrated in FIG. 2.

Next, a configuration of the drive transmission device 6 will be described with reference to FIG. 3. FIG. 3 is a perspective view illustrating the drive transmission device 6 that drives the pickup roller 12. As illustrated in FIG. 3, the drive transmission device 6 includes a motor M, a motor drive shaft 61, a first drive train 62, a second drive train 63, a fifth gear 64, and a sixth gear 65. The first drive train 62 includes a first gear 621, a second gear 622, and a rotary shaft 623. A one-way clutch 624a is provided between the first gear 621 and the rotary shaft 623. A one-way clutch 624b is provided between the second gear 622 and the rotary shaft 623. The second drive train 63 includes a third gear 631, a fourth gear 632, and a rotary shaft 633. An electromagnetic clutch 634 is provided between the rotary shaft 633 and the third and fourth gears 631 and 632. The sixth gear 65 is connected to a rotary shaft of the pickup roller 12.

The first gear 621 engages the third gear 631. The second gear 622 engages the fourth gear 632. The fourth gear 632 also engages the fifth gear 64. The fifth gear 64 also engages the sixth gear 65.

Next, rotation directions of the respective gears will be described. A situation in which the motor drive shaft 61 rotates to the right (clockwise) as indicated by an arrow R1 will be described. The first gear 621, the second gear 622, and the rotary shaft 623 of the first drive train 62 rotate to the left (counterclockwise) as indicated by an arrow R2. The third gear 631, the fourth gear 632, and the rotary shaft 633 of the second drive train 63 rotate to the right (clockwise) as indicated by an arrow R3. The fifth gear 64 rotates to the left (counterclockwise) as indicated by an arrow R4. The sixth gear 65 rotates to the right (clockwise) as indicated by an arrow R5.

The one-way clutches 624a and 624b of the first drive train 62 each transmit turning force in one direction only. In the present embodiment, the one-way clutch 624a transmits driving force from the first gear 621 to the rotary shaft 623 only in a situation in which a rotational speed of the first gear 621 rotating to the left (counterclockwise) is not less than a rotational speed of the rotary shaft 623. The one-way clutch 624b transmits the driving force from the rotary shaft 623 to the second gear 622 only in a situation in which a rotational speed of the second gear 622 rotating to the left (counterclockwise) is no greater than the rotational speed of the rotary shaft 623. The motor M and the electromagnetic clutch 634 are controlled by the controller 5.

Figure 4:
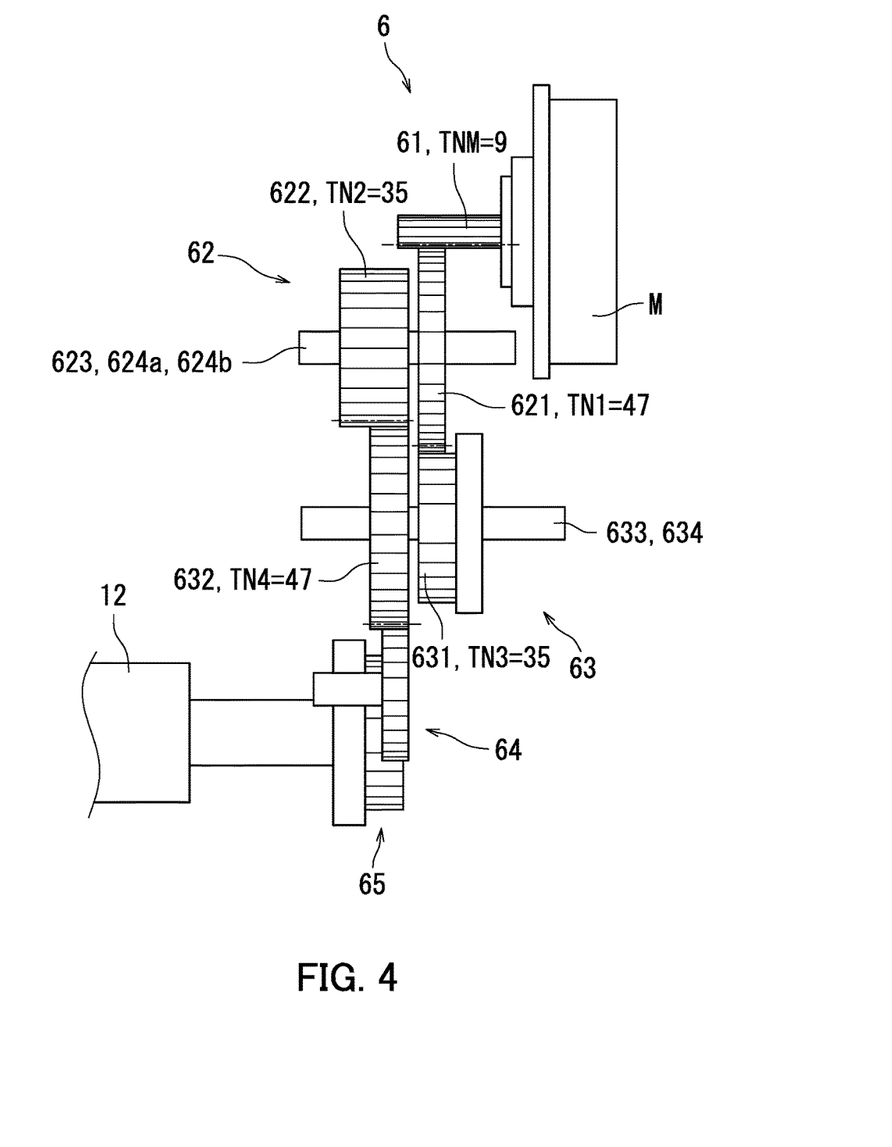
FIG. 4 is a side view illustrating gear arrangement of the drive transmission device illustrated in FIG. 3.

Next, the following describes numbers of teeth of the respective gears with reference to FIG. 4. FIG. 4 is a side view illustrating gear arrangement of the drive transmission device 6 illustrated in FIG. 3. The motor drive shaft 61 has teeth on the circumferential surface thereof. The number of the teeth of the motor drive shaft 61 is represented by a teeth number TNM (for example, TNM=9). The first gear 621 has teeth on the circumferential surface thereof. The number of the teeth of the first gear 621 is represented by a teeth number TN1 (for example, TN1=47). The second gear 622 has teeth on the circumferential surface thereof. The number of the teeth of the second gear 622 is represented by a teeth number TN2 (for example, TN2=35). The third gear 631 has teeth on the circumferential surface thereof. The number of the teeth of the third gear 631 is represented by a teeth number TN3 and is smaller than the teeth number TN1 of the first gear 621 (for example, TN3=35). The fourth gear 632 has teeth on the circumferential surface thereof. The number of the teeth of the fourth gear 632 is represented by a teeth number TN4 and is larger than the teeth number TN2 of the second gear 622 (for example, TN4=47).

Figure 5:
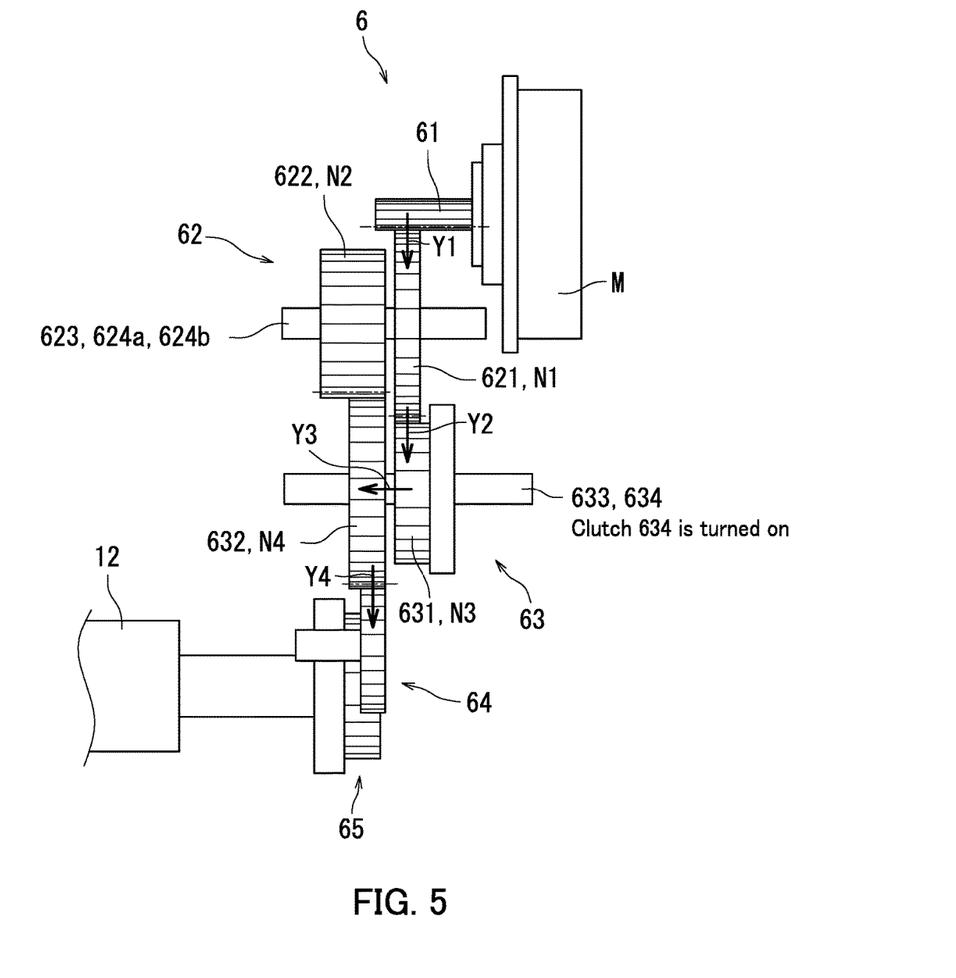

Next, the following describes a transmission path of driving force and rotational speeds of the respective gears in a situation in which the electromagnetic clutch 634 is turned on, with reference to FIG. 5. FIG. 5 is a side view illustrating operation of the drive transmission device 6 in a situation in which the electromagnetic clutch 634 is turned on. In the situation in which the electromagnetic clutch 634 is turned on, the rotary shaft 633, the third gear 631, and the fourth gear 632 rotate integrally.

First, the transmission path of the driving force will be described. Driving force of the motor M is transmitted from the motor drive shaft 61 to the first gear 621 as indicated by an arrow Y1. The driving force is then transmitted from the first gear 621 to the third gear 631 as indicated by an arrow Y2. The driving force is then transmitted from the third gear 631 to the fourth gear 632 via the rotary shaft 633 as indicated by an arrow Y3. The driving force is then transmitted from the fourth gear 632 to the fifth gear 64 as indicated by an arrow Y4.

Next, the rotational speeds will be described. The third gear 631 engages the first gear 621. Therefore, a rotational speed N3 of the third gear 631 can be determined using a rotational speed N1 of the first gear 621 according to the following Formula (1).

$$N3=(TN1/TN3) \times N1 \tag{1}$$

Here, TN1 represents the teeth number of the first gear 621 and TN3 represents the teeth number of the third gear 631.

A rotational speed N4 of the fourth gear 632 is the same as the rotational speed N3 of the third gear 631 since the rotary shaft 633, the third gear 631, and the fourth gear 632 rotate integrally as described above. Therefore, the rotational speed N4 of the fourth gear 632 can be determined according to the following Formula (2).

$$N4=(TN1/TN3) \times N1 \tag{2}$$

Note that the second gear 622 rotates in accompaniment with rotation of the fourth gear 632 since the fourth gear 632 engage the second gear 622. A rotational speed N2 of the second gear 622 can be determined according to the following Formula (3).

$$N2=(TN4/TN2) \times N4 \tag{3}$$

By substituting the above Formula (2) in the above formula (3), the following Formula (4) can be obtained.

$$N2=(TN4/TN2) \times (TN1/TN3) \times N1 \tag{4}$$

Here, the teeth number TN4 of the fourth gear 632 is larger than the teeth number TN2 of the second gear 622, and the teeth number TN1 of the first gear 621 is larger than the teeth number TN3 of the third gear 631 as explained above with reference to FIG. 4. Therefore, the rotational speed N2 of the second gear 622 is greater than the rotational speed N1 of the first gear 621 and the rotary shaft 623. As a result, the one-way clutch 624b slips and the second gear 622 idles relative to the rotary shaft 623.

Figure 6:
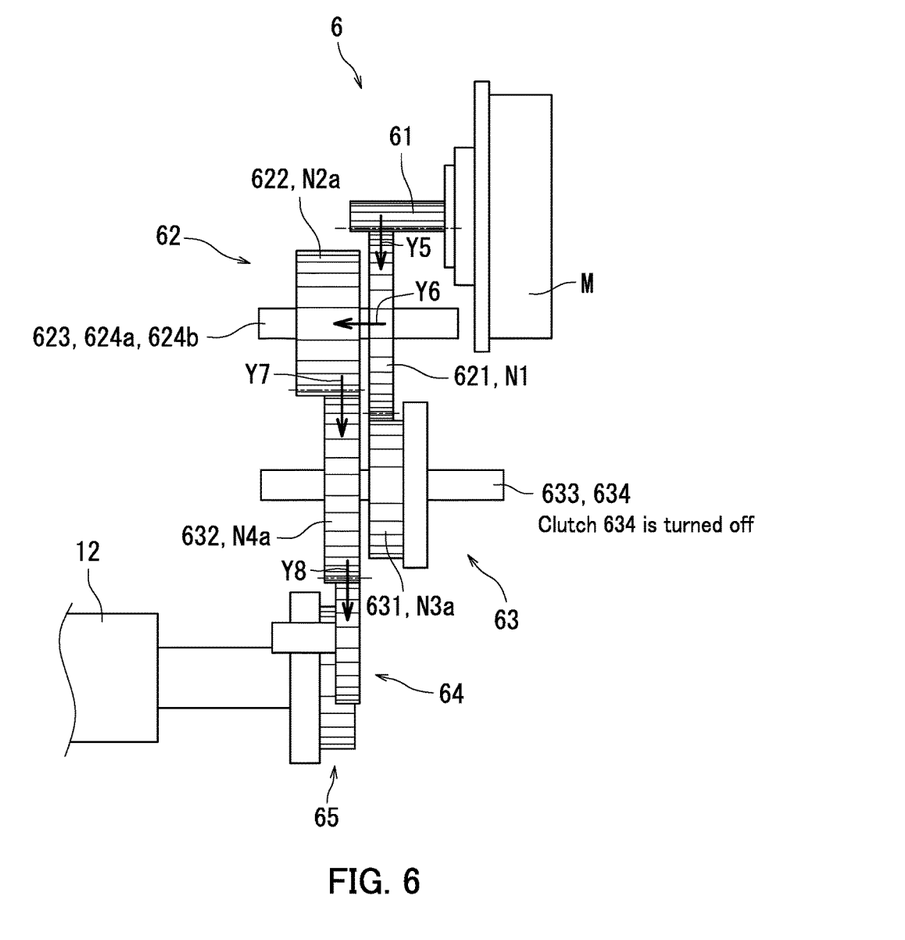
FIG. 6 is a side view illustrating an operation of the drive transmission device illustrated in FIG. 3 in a situation in which the electromagnetic clutch is turned off.

Next, with reference to FIG. 6, the following describes a transmission path of driving force and rotational speeds of the respective gears in a situation in which the electromagnetic clutch 634 is turned off. FIG. 6 is a side view illustrating operation of the drive transmission device 6 in a situation in which the electromagnetic clutch 634 is turned off. In the situation in which the electromagnetic clutch 634 is turned off, the rotary shaft 633, the third gear 631, and the fourth gear 632 rotate separately from one another.

First, the transmission path of the driving force will be described. Driving force of the motor M is transmitted from the motor drive shaft 61 to the first gear 621 as indicated by an arrow Y5. Since the electromagnetic clutch 634 is turned off, the driving force of the motor M is not transmitted to the fourth gear 632. Therefore, the second gear 622 is not driven by the fourth gear 632.

Meanwhile, the first gear 621 is driven by the motor drive shaft 61, and the rotary shaft 623 is driven by the first gear 621 via the one-way clutch 624*a*. Also, the second gear 622 is driven by the rotary shaft 623 via the one-way clutch 624*b*. Therefore, the first gear 621, the second gear 622, and the rotary shaft 623 rotate integrally.

Thus, the driving force is transmitted from the first gear 621 to the second gear 622 as indicated by an arrow Y6. The driving force is then transmitted from the second gear 622 to the fourth gear 632 as indicated by an arrow Y7. The driving force is then transmitted from the fourth gear 632 to the fifth gear 64 as indicated by an arrow Y8.

Next, the rotational speeds will be described. A rotational speed N2*a* of the second gear 622 is the same as the rotational speed N1 of the first gear 621 since the first gear 621, the second gear 622, and the rotary shaft 623 rotate integrally as described above. The fourth gear 632 engages the second gear 622. Therefore, a rotational speed N4*a* of the fourth gear 632 can be determined using the rotational speed N1 of the first gear 621 according to the following Formula (5).

$$N4a=(TN2/TN4) \times N1 \quad (5)$$

By eliminating the rotational speed N1 from the above Formulas (2) and (5), the following Formula (6) can be obtained.

$$N4=(TN1/TN3) \times (TN4/TN2) \times N4a \quad (6)$$

By substituting the teeth numbers in the above Formula (6), the following Formula (7) can be obtained.

$$N4=1.8 \times N4a \quad (7)$$

Therefore, a rotational speed of the pickup roller 12 can be increased by 1.8 times by switching the electromagnetic clutch 634 from "off" to "on".

As described above, switching of the rotational speed of the pickup roller 12 can be realized by providing the first drive train 62 including the one-way clutches 624 and the second drive train 63 including the electromagnetic clutch 634, and switching on/off the electromagnetic clutch 634. Thus, a rotational speed of an output shaft can be switched between two levels with a simple configuration.

Further, in the first drive train 62, the first gear 621 and the second gear 622 are connected to the rotary shaft 623 via the one-way clutches 624. The first teeth number TN1 of the teeth formed on the circumferential surface of the first gear 621 differs from the second teeth number TN2 of the teeth formed on the circumferential surface of the second gear 622. Further, in the second drive train 63, the third gear 631 and the fourth gear 632 are connected to the rotary shaft 633 via the electromagnetic clutch 634. The third gear 631 engages the first gear 621, and the third teeth number TN3 of the teeth formed on the circumferential surface of the third gear 631 differs from the fourth teeth number TN4 of the teeth formed on the circumferential surface of the fourth gear 632. Through the above, the transmission path of the driving force can be changed by switching on/off the electromagnetic clutch 634. Therefore, the rotational speed of the output shaft can be switched between two levels with a simple configuration.

Further, the drive shaft 61 of the motor M engages the first gear 621 and the rotary shaft of the pickup roller 12 engages the fourth gear 632 via the fifth gear 64. Through the above, the transmission path of the driving force from the first gear 621 to the fourth gear 632 can be changed by switching on/off the electromagnetic clutch 634. Therefore, the rotational speed of the output shaft can be switched between two levels with a simple configuration.

Further, a gear ratio of the first gear 621 to the third gear 631 (TN1/TN3) is the same as a gear ratio of the fourth gear 632 to the second gear 622 (TN4/TN2). Therefore, a desired speed ratio (1.8 in the present embodiment) can be realized by the two pairs of the gears having the appropriate gear ratio (47/35).

Through the above, the embodiment of the present invention has been described. However, it should be noted that the present invention is not limited to the above embodiment and is practicable in various manners within the scope not departing from the gist of the present invention (for example, as described below in sections (1) to (5)). The drawings schematically illustrate elements of configuration in order to facilitate understanding and properties of elements of configuration illustrated in the drawings, such as thicknesses, lengths, and numbers thereof, may differ from actual properties thereof in order to facilitate preparation of the drawings. Furthermore, properties of the elements of configuration described in the above embodiment, such as shapes and dimensions, are merely examples and are not intended as specific limitations. Various alterations may be made so long as there is no substantial deviation from the configuration of the present invention.

(1) The present embodiment has been described for a configuration in which the drive transmission device 6 drives the pickup roller 12. However, in a configuration, the drive transmission device 6 may drive another roller in the image forming apparatus 100. For example, in a configuration, the drive transmission device 6 may drive at least one of the conveyance roller pair 13, the photosensitive drum 151, and the heating roller and the pressure roller of the fixing device 16 of the image forming apparatus 100.

(2) The present embodiment has been described for a configuration in which the first gear 621 engages the third gear 631, and the second gear 622 engages the fourth gear 632. However, the present invention is not limited to such a configuration. For example, in a configuration, the first gear 621 and the third gear 631 may be connected to each other via a pulley so as to be capable of transmitting the driving force, and the second gear 622 and the fourth gear 632 may be connected to each other via a pulley so as to be capable of transmitting the driving force.

(3) The present embodiment has been described for a configuration in which the drive shaft 61 of the motor M engages the first gear 621. However, in a configuration, the drive shaft 61 of the motor M may engage the second gear 622.

(4) The present embodiment has been described for a configuration in which the rotary shaft of the pickup roller 12 engages the fourth gear 632 via the fifth gear 64. However, the present invention is not limited to such a configuration. For example, in a configuration, the rotary shaft of the pickup roller 12 may engage the third gear 631 via at least one gear. Alternatively, in a configuration, the rotary shaft of the pickup roller 12 may for example engage the third gear 631 or the fourth gear 632.

(5) The present embodiment has been described for a configuration in which the rotary shaft of the pickup roller 12 engages the fourth gear 632 via the fifth gear 64.

However, the present invention is not limited to such a configuration. For example, in a configuration, the rotary shaft of the pickup roller 12 may engage the second gear 622 via at least one gear. Alternatively, in a configuration, the rotary shaft of the pickup roller 12 may engage the second gear 622.

INDUSTRIAL APPLICABILITY

The present invention is applicable to a drive transmission device that controls power supplied to a clutch, and an image forming apparatus.

The invention claimed is:
1. A drive transmission device that transmits driving force of a motor to a roller via a plurality of drive trains, the drive transmission device comprising:
a controller;
a first drive train including a one-way clutch; and
a second drive train that is different from the first drive train and includes an electromagnetic clutch, wherein
the first drive train receives the driving force from the motor and transmits the driving force to the second drive train,
the second drive train transmits the driving force from the first drive train to the roller,
the controller switches a rotational speed of the roller by switching on/off the electromagnetic clutch,
the first drive train includes a first gear, a second gear, and a rotary shaft to which the first gear and the second gear are connected via the one-way clutch,
the first gear and the second gear each have teeth on an outer circumferential surface thereof,
the number of the teeth of the first gear is a first teeth number and the number of the teeth of the second gear is a second teeth number that is different from the first teeth number,
the second drive train includes a third gear, a fourth gear, and a rotary shaft to which the third gear and the fourth gear are connected via the electromagnetic clutch,
the third gear engages the first gear,
the third gear and the fourth gear each have teeth on an outer circumferential surface thereof, and
the number of the teeth of the third gear is a third teeth number and the number of the teeth of the fourth gear is a fourth teeth number that is different from the third teeth number.
2. The drive transmission device according to claim 1, wherein
the one-way clutch transmits the driving force from the first gear to the rotary shaft of the first drive train only in a situation in which a rotational speed of the first gear is not less than a rotational speed of the rotary shaft of the first drive train, and transmits the driving force from the rotary shaft of the first drive train to the second gear only in a situation in which the rotational speed of the rotary shaft of the first drive train is not less than a rotational speed of the second gear.
3. The drive transmission device according to claim 1, wherein
the one-way clutch transmits the driving force from the first gear to the rotary shaft of the first drive train only in a situation in which a rotational speed of the first gear rotating in a predetermined direction is not less than a rotational speed of the rotary shaft of the first drive train rotating in the predetermined direction, and transmits the driving force from the rotary shaft of the first drive train to the second gear only in a situation in which the rotational speed of the rotary shaft of the first drive train rotating in the predetermined direction is not less than a rotational speed of the second gear rotating in the predetermined direction.
4. The drive transmission device according to claim 1, wherein
a drive shaft of the motor engages the first gear or the second gear, and
a rotary shaft of the roller engages the third gear or the fourth gear.
5. The drive transmission device according to claim 1, wherein
a drive shaft of the motor engages the first gear or the second gear, and
a rotary shaft of the roller engages the third gear or the fourth gear via at least one gear.
6. The drive transmission device according to claim 1, wherein
a drive shaft of the motor engages one of the first gear and the second gear, and
a rotary shaft of the roller engages the other of the first gear and the second gear.
7. The drive transmission device according to claim 1, wherein
a drive shaft of the motor engages one of the first gear and the second gear, and
a rotary shaft of the roller engages the other of the first gear and the second gear via at least one gear.
8. The drive transmission device according to claim 1, wherein
a gear ratio of the first gear to the third gear is substantially the same as a gear ratio of the fourth gear to the second gear.
9. The drive transmission device according to claim 1, wherein
the fourth teeth number is substantially the same as the first teeth number, and the third teeth number is substantially the same as the second teeth number.
10. An image forming apparatus, comprising:
an image forming section that forms an image on recording paper; and
the drive transmission device according to claim 1.
11. The image forming apparatus according to claim 10, wherein
the roller comprises at least one of a pickup roller that feeds the uppermost sheet of sheets of recording paper stacked in a paper feed cassette, a conveyance roller that conveys the recording paper, a photosensitive drum, and a fixing roller.

\* \* \* \* \*